United States Patent
Shiomi et al.

(10) Patent No.: US 8,683,155 B2
(45) Date of Patent: Mar. 25, 2014

(54) VIRTUALIZATION CONTROL APPARATUS AND STORAGE SYSTEM

(75) Inventors: Hiroshi Shiomi, Kawasaki (JP); Koutarou Sasage, Kawasaki (JP); Akira Satou, Kawasaki (JP); Ryosuke Suzuki, Kawasaki (JP); Yasuhito Kikuchi, Kawasaki (JP); Kenichi Fujita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 145 days.

(21) Appl. No.: 13/239,812

(22) Filed: Sep. 22, 2011

(65) Prior Publication Data
US 2012/0084522 A1    Apr. 5, 2012

(30) Foreign Application Priority Data

Oct. 4, 2010    (JP) ................. 2010-225257

(51) Int. Cl.
*G06F 12/00*    (2006.01)
*G06F 13/00*    (2006.01)
*G06F 13/28*    (2006.01)

(52) U.S. Cl.
USPC ............ 711/162; 711/148; 711/170; 710/316

(58) Field of Classification Search
USPC ................. 711/148, 162, 170; 710/316
See application file for complete search history.

(56) References Cited

U.S. PATENT DOCUMENTS

| 7,305,520 | B2 | 12/2007 | Voigt et al. | |
|---|---|---|---|---|
| 7,539,824 | B2 | 5/2009 | Lolayekar et al. | |
| 2003/0229645 | A1* | 12/2003 | Mogi et al. | 707/102 |
| 2004/0193827 | A1* | 9/2004 | Mogi et al. | 711/170 |
| 2005/0015407 | A1 | 1/2005 | Nguyen et al. | |
| 2006/0242356 | A1* | 10/2006 | Mogi et al. | 711/100 |
| 2007/0094357 | A1 | 4/2007 | Sugitani et al. | |

FOREIGN PATENT DOCUMENTS

| JP | 2005-505035 A | 2/2005 |
|---|---|---|
| JP | 2005-222539 A | 8/2005 |
| JP | 2006-65773 A | 3/2006 |
| JP | 2007-115019 A | 5/2007 |
| JP | 2007-529059 A | 10/2007 |

* cited by examiner

*Primary Examiner* — Michael Alsip
(74) *Attorney, Agent, or Firm* — Fujitsu Patent Center

(57) ABSTRACT

A virtualization control apparatus includes a selection unit that, when receiving a copy request, conducting an access test corresponding to the copy request on each of the virtualization switch units and selects one of the virtualization switch units of the highest performance among the plurality of the virtual switch units, and a sending unit that sends the copy request to the selected virtualization switch unit.

5 Claims, 16 Drawing Sheets

FIG. 4A

| TYPE | SOURCE | DESTINATION DISK | ADDRESS |
|---|---|---|---|
| READ REQUEST | SERVER 001 | LV-01 | 020010h |

| TYPE | SOURCE | DESTINATION DISK | ADDRESS |
|---|---|---|---|
| READ REQUEST | SERVER 001 | 305-3 | 000010h |

| TYPE | SOURCE | DESTINATION DISK | ADDRESS | DATA |
|---|---|---|---|---|
| RESPONSE TO READ REQUEST | 305-2 | SERVER 001 | 000010h | ...... |

| TYPE | SOURCE | DESTINATION DISK | ADDRESS | DATA |
|---|---|---|---|---|
| RESPONSE TO READ REQUEST | LV-01 | SERVER 001 | 020010h | ...... |

2002

| MASTER | MIRROR |
|---|---|
| 305-1 | 305-2 |
| 305-3 | 305-4 |
| 305-5 | 305-6 |
| 305-7 | 305-8 |

| TYPE | SOURCE | DESTINATION DISK | ADDRESS |
|---|---|---|---|
| WRITE REQUEST | SERVER 001 | 305-3 | 000010h |

| TYPE | SOURCE | DESTINATION DISK | ADDRESS |
|---|---|---|---|
| WRITE REQUEST | SERVER 001 | 305-4 | 000010h |

FIG. 15

| SESSION ID | SWITCH DEVICE IN CHARGE OF COPY | COPY SOURCE VIRTUAL VOLUME | COPY DESTINATION VIRTUAL VOLUME | COPY PERFORMANCE [MBPS] | BOTH PATH STATUS |
|---|---|---|---|---|---|
| 1 | 2a | LV 01 | LV 02 | 500 | ONLINE |
| 2 | 2a | LV 01 | LV 02 | 500 | ONLINE |
| 3 | 2b | LV 01 | LV 02 | 500 | ONLINE |

| SESSION ID | SWITCH DEVICE IN CHARGE OF COPY | COPY SOURCE VIRTUAL VOLUME | COPY DESTINATION VIRTUAL VOLUME | COPY PERFORMANCE [MBPS] | BOTH PATH STATUS |
|---|---|---|---|---|---|
| 1 | 2a | LV01 | LV02 | 200 | ONLINE |
| 2 | 2a | LV02 | LV01 | 500 | ONLINE |
| 3 | 2a | LV01 | LV02 | 500 | ONLINE |
| 4 | 2a | LV01 | LV02 | 500 | ONLINE |
| 5 | 2b | LV02 | LV01 | 500 | ONLINE |
| 6 | 2b | LV01 | LV02 | 500 | ONLINE |

FIG. 18

| SESSION ID | SWITCH DEVICE IN CHARGE OF COPY | COPY SOURCE VIRTUAL VOLUME | COPY DESTINATION VIRTUAL VOLUME | COPY PERFORMANCE [MBPS] | BOTH PATH STATUS |
|---|---|---|---|---|---|
| 1 | 2a | LV 01 | LV 02 | 200 | ONLINE |
| 2 | 2a | LV 02 | LV 01 | 500 | ONLINE |
| 3 | 2b | LV 01 | LV 02 | 300 | ONLINE |
| 4 | 2a | LV 01 | LV 02 | 500 | ONLINE |
| 5 | 2b | LV 02 | LV 01 | 300 | ONLINE |
| 6 | 2b | LV 01 | LV 02 | 150 | ONLINE |

206a

VIRTUALIZATION CONTROL APPARATUS AND STORAGE SYSTEM

CROSS-REFERENCE TO RELATED APPLICATION

This application is based upon and claims the benefit of priority of the prior Japanese Patent Application No. 2010-225257, filed on Oct. 4, 2010, the entire contents of which are incorporated herein by reference.

FIELD

The embodiment discussed herein is related to a virtualization control apparatus and a storage system.

BACKGROUND

Storage virtualization switches (hereafter referred to as virtualization switch devices) are devices for integrally controlling physical volumes of multiple disk units and showing the physical volumes to the host computer as logical volumes. Such a virtualization switch device is commonly connected to a disk device including multiple disk units and to a server that makes a request to the virtualization switch devices, via lines such as fiber channels.

Among disk devices is one including a control module (hereafter referred to as a CM) that controls multiple disks under its command.

Connected to such a CM via disk adaptors (DA) or the like are multiple disk units. The virtualization switch device accesses the disk units via the CM.

Such storage systems include one that makes the virtualization switch device redundant by including multiple virtualization switch devices and enabling a controller, the server, to access each virtualization switch device. This configuration allows reducing the load imposed on each virtualization switch device in the storage system, as well as continuously operating the entire system even when any of the virtualization switch devices goes down.

Accordingly, in the related-art controller, it is difficult to distribute the load in accordance with the load situation of the actual CMs or disk units, although it is possible to distribute the load corresponding to the logical volumes. In particular, in a copy process, reading of data and writing of the data are performed on multiple disk units. Thus, depending on which of the virtualization switch devices the server instructs to perform the copy process, performance often significantly varies.

Japanese Laid-open Patent Publication (Translation of PCT Application) No. 2005-505035

SUMMARY

According to an aspect of the embodiment, a virtualization control apparatus of a storage system, the storage system including a plurality of storage controllers controlling a plurality of storage units connected thereto and a plurality of virtualization switch units being connected to one of the storage controllers, each of the virtualization switch units converting a copy source logical volume address and a copy destination logical volume address contained in a received copy request into addresses of the storage units and making a request to the storage controllers on the basis of the converted addresses. The virtualization control apparatus includes a selection unit that, when receiving a copy request, conducting an access test corresponding to the copy request on each of the virtualization switch units and selects one of the virtualization switch units of the highest performance among the plurality of the virtual switch units, and a sending unit that sends the copy request to the selected virtualization switch unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 4A to 4D are diagrams illustrating a request from a device according to this embodiment.

FIG. 15 is a diagram illustrating a virtualization switch device-in-charge management table according to this embodiment.

FIG. 17 is a diagram illustrating a virtualization switch device-in-charge management table according to this embodiment.

FIG. 18 is a diagram illustrating a virtualization switch device-in-charge management table according to this embodiment.

DESCRIPTION OF EMBODIMENT

In the above-mentioned related-art configuration, the virtualization switch devices convert the physical volumes of the disk units into logical volumes. Accordingly, the controller may recognize only information corresponding to the logical volumes. For this reason, when the server instructs a virtualization switch device to access a certain logical volume, it may not know which of the disk units the virtualization switch device is accessing via which CM.

Figure 1:
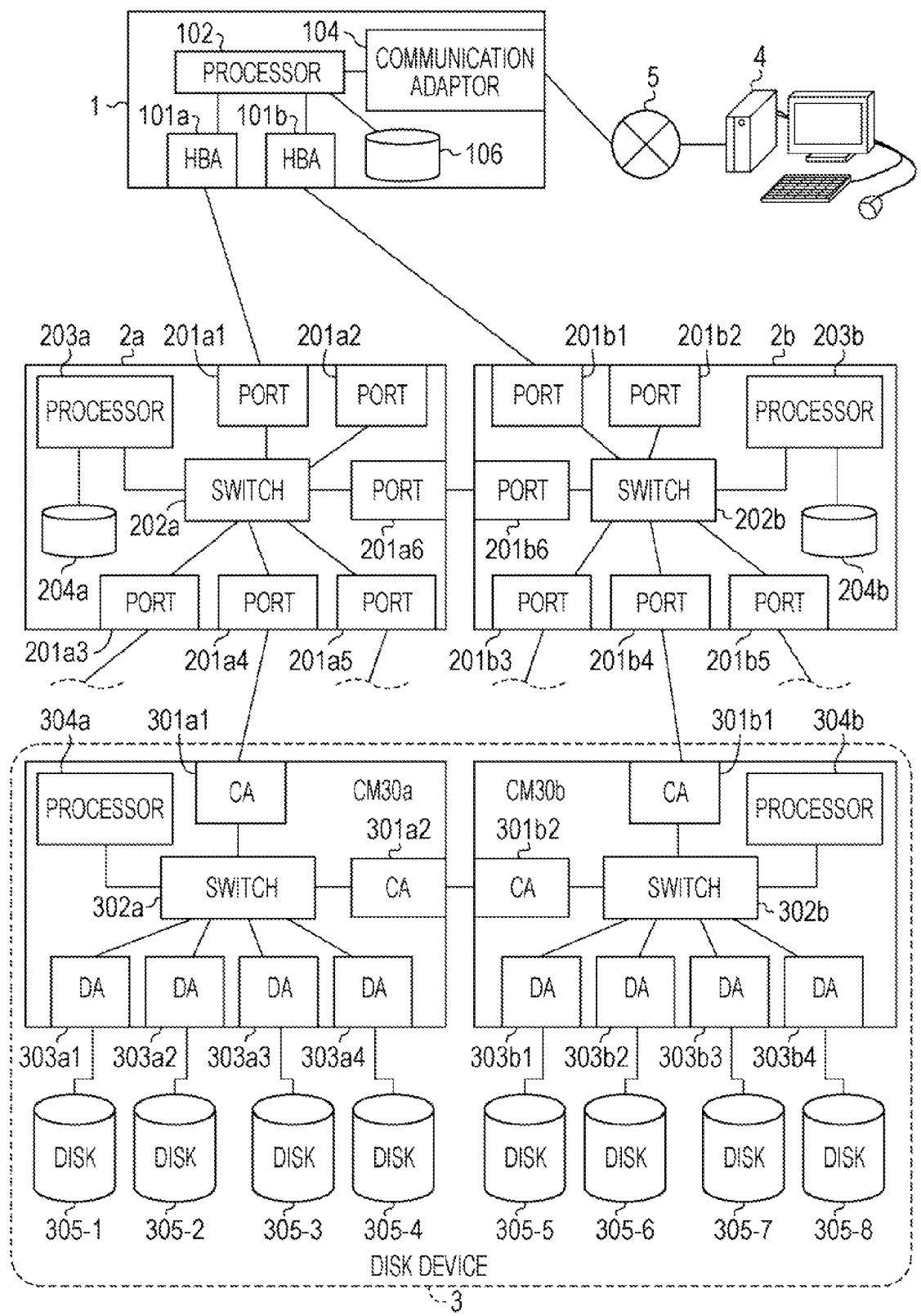
FIG. 1 is a block diagram of a storage system according to an embodiment.

FIG. 1 is a diagram illustrating the configuration of a storage system according to an embodiment.

The storage system according to this embodiment includes a server 1 as a controller, virtualization switch devices 2a and 2b, and a disk device 3.

The server 1 accesses data stored in the disk device 3 in accordance with a request a terminal 4 sends via a network 5. The server 1 includes HBAs 101a and 101b, which are interfaces used to communicate with the virtualization switch devices 2a and 2b. The server 1 also includes a communication adaptor 104, which is connected to the network 5 and used to communicate with the terminal 4.

The server 1 also includes a processor 102, which controls components within the server. The processor 102 controls the HBAs 101a and 101b to make to both the virtualization switch devices 2a and 2b a write request, read request, or copy request to be sent to virtual logical volumes.

The server 1 also includes a storage unit 106. Unless otherwise specified, it is assumed in this embodiment that the processor 102 performs processes to be discussed later by executing programs stored in the storage unit 106.

The virtualization switch devices 2a and 2b integrally controls the disk device 3 controlled by multiple CMs, 30a and 30b and perform a process for illustrating physical volumes to the host computer, the server 1, as virtual volumes. The virtualization switch devices 2a and 2b includes the same components so as to obtain a redundant configuration.

The virtualization switch device 2a includes ports 201a1 to 201a5, a switch 202a, a processor 203a, and a storage unit 204a. The virtualization switch device 2b includes ports 201b1 to 201b5, a switch 202b, a processor 203b, and a storage unit 204b.

Connected to the ports 201a1 to 201a5 and 201b1 to 201b5 are communication lines from other devices. The virtualization switch devices 2a and 2b receive or send data from or to the other devices via the communication lines.

In this embodiment, the HBAs 101a and 101b of the server 1 are connected to the ports 201a1 and 201b1, respectively. The port 201a4 of the virtualization switch device 2a is connected to a CA 301a1 of the CM (controller) 30a of the disk device 3. Likewise, the port 201b4 of the virtualization switch device 2b is connected to a CA 301b1 of the CM (controller) 30b of the disk device 3.

The switches 202a and 202b are connected to the ports 201a1 to 201a5 and 201b1 to 201b5, respectively. The switch 202a transfers data received by one of the ports 201a1 to 201a5 to the other ports under the control of the processor 203a. Likewise, the switch 202b transfers data received by one of the ports 201b1 to 201b5 to the other ports under the control of the processor 203b.

Specifically, the processor 203a converts a disk address attached to data received from one of the ports 201a1 to 201a5 on the basis of an address conversion table 210a stored in the storage unit 204a and then controls the switch 202a to transfer the converted data to a port (one of the 201a1 to 201a5) to which the destination device is connected. Likewise, the processor 203b converts a disk address attached to data received from one of the ports 201b1 to 201b5 on the basis of an address conversion table 210b stored in the storage unit 204b and controls the switch 202b to transfer the converted data to a port (one of 201b1 to 201b5) to which the destination device is connected.

The storage units 204a and 204b are storing the logical volume management tables 205a and logical volume management table 205b, respectively, which show the correspondences between the logical volumes and the virtualization switch devices 2a and 2b.

Figure 2:
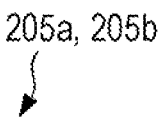
FIG. 2 is a diagram illustrating a logical volume management table according to this embodiment.

As illustrated in FIG. 2, logical volume numbers LV-01 and LV-02 and the numbers of the virtualization switch devices are stored as associated with each other in the logical volume management tables 205a and 205b. For the sake of convenience, it is assumed in this embodiment that the numbers of the virtualization switch devices are "2a" "2b," which are the same as their symbols.

The storage units 204a and 204b also contain virtualization switch device-in-charge management tables 206a and 206b, respectively, storing information as to which of the virtualization switch devices 2a and 2b is in charge of each of multiple copy processes. As will be described later, in a copy process, a selection process with reference to the virtualization switch device-in-charge management tables 206a and 206b takes precedence over a selection process with reference to the logical volume management tables 205a and 205b. The virtualization switch device-in-charge management tables 206a and 206b will be described in detail later.

Figure 3:
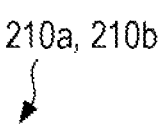
FIG. 3 is a diagram illustrating an address conversion table according to this embodiment.

The storage units 204a and 204b also contain address conversion tables 210a and 210b, respectively, as illustrated in FIG. 3.

As illustrated in FIG. 3, logic addresses in the logical volumes LV-01 and LV-02 and the addresses of disk units 305-1, 305-3, 305-5, and 305-7 among disk units 305-1 to 305-8 stored in the disk device 3 are stored as associated with each other in the address conversion tables 210a and 210b.

The processors 203a and 203b convert addresses with reference to the address conversion tables 210a and 210b. For example, when the port 201a1 receives from the server 1 a request 1001 for reading 020010h of the logical volume LV-01 as illustrated in FIG. 4A, the processor 203a extracts the address of a disk unit corresponding to the logical volume with reference to the address conversion table 210a. That is, the processor 203a extracts an address 00020h of the disk unit 305-3. As illustrated in FIG. 4B, the processor 203a generates a read request 2001 by converting the destination of the read request 1001 into the extracted disk unit address. The processor 203a then sends the request 2001 to the disk device 3 via the port 201a4.

Subsequently, when the switch 202a receives a response 3001 (FIG. 4C) corresponding to the read request 2001 from the disk device 3, the processor 203a converts the address with reference to the address conversion table 210a.

Specifically, the processor 203a generates a response 2002 (FIG. 4D) by converting the source address of the response 3001 into an address of the logical volume LV-01 with reference to the address conversion table 210a.

The processor 203a then sends the response 2002 to the destination, the disk device 1, via the port 201a1.

Note that, in this embodiment, the address conversion table 210a contained in the storage units 204a and the address conversion table 210b contained in the storage unit 204b are storing the same values. Further, it is assumed that the processors 203a and 203b of the virtualization switch devices 2a and 2b communicate with each other via the ports 201a6 and 201b6 so that the same values are always held in the address conversion tables 210a and 210b.

The storage units 204a and 204b also contain RAID management tables 211a and 211b, respectively.

Figure 5:
FIG. 5 is a diagram illustrating a RAID management table according to this embodiment.

As illustrated in FIG. 5, the RAID management tables 211a and 211b are storing the correspondences between the disk units 305-1, 305-3, 305-5, and 305-7 and the disk units 305-2, 305-4, 305-6, and 305-8.

When the 203a and 203b receive a write request from the server 1 as described above, they perform the above-mentioned conversion process, as well as generate a write request to be sent to a disk unit serving as a mirror with reference to the RAID management tables 211a and 211b.

Figure 6A:
FIG. 6A and 6B are diagrams illustrating a write request according to this embodiment.

For example, when the processor 203a generates a write request 2003 to be sent to the disk unit 305-3 illustrated in FIG. 6A by converting the address of the request from the server 1, it refers to the RAID management table 211a.

Figure 6B:

In the RAID management table 211a, a mirror corresponding to the disk unit 305-3 is the disk unit 305-4. Accordingly, as illustrated in FIG. 6B, the processor 203a generates a request 2004 by converting the destination of the request 2003 into the disk unit 305-4 and sends the request 2004 to the disk device 3.

Back in FIG. 1, the disk device 3 is connected to the virtualization switch devices 2a and 2b.

The disk device 3 includes the multiple disk units, 305-1 to 305-8, and the CMs (controller modules) 30a and 30. The CM 30a includes a CA (channel adaptor) 301a1 connected to the port 201a4 of the virtualization switch device 2a. Likewise, the CM 30b includes a CA 301b1 connected to the port 201b4 of the virtualization switch device 2b. The CM 30a includes DAs (disk adaptors) 303a1 to 303a4 connected to the disk units 305-1 to 305-4. Likewise, the CM 30b includes DAs 303b1 to 303b4 connected to the disk units 305-5 to 305-8.

The CMs 30a and 30b are connected to each other via the CAs 301a2 and 301b2 so that they may communicate with each other.

The switch 302a controls the communication between the CMs 301a1 and 301a2 and the DAs 303a1 to 303a4 under the control of the processor 304a. Likewise, the switch 302b controls the communication between the CMs 301b1 and 301b2 and the DAs 303b1 to 303b4 under the control of the processor 304b.

When the processor 304a receives a request from the virtualization switch device 2a via the CA 301a1, it controls the switch 302a to write data to one of the disk units 305-1 to 305-4. Likewise, when the processor 304b receives a request from the virtualization switch device 2b via the CA 301b1, it controls the switch 302b to write data to one of the disk units 305-5 to 305-8.

When the CM 30a or CM30b receives a request about one of the disk units 305-1 to 305-8 not under its charge, the processor 304a or processor 304b controls the switch 302a or switch 302b to transfer the request to the other CM via the CA 301a2 or CA 301b2.

For example, assume that the CA 301a1 of the CA 30a has received from the virtualization switch device 2a a read request to be sent to the disk unit 305-7. Since none of the DAs 303a1 to 303a4 is not connected to the disk unit 305-7, the processor 304a controls the switch 302a to transfer the request to the CM 30b via the CA 301a2. When the CA 301b2 of the CM 30b receives the transferred request, the processor 304b controls the switch 302b so that the request is relayed to the DA 303b3 connected to the disk unit 305-7.

A copy process performed on the logical volume LV01 in the storage server system configured as described above will be described.

As described above, the virtualization switch devices 2a and 2b may perform a process using logical volumes by performing conversion between a logical volume number and an address of the disk device. However, the logical volumes and the disk units of the disk device do not correspond to each other one-to-one as in this embodiment. Further, as illustrated in the logical volume number LV-02 of the address conversion tables 210a and 210b of FIG. 3, a single logical volume may correspond to the disk unit 305-1 controlled by the CM 30a and the disk units 305-3 and 305-5 controlled by the CM 30b.

The server 1 sends a request to both the virtualization switch devices 2a and 2b via the HBAs 101a and 101b.

The processor 203a of the virtualization switch device 2a determines whether the request is a request the processor is in charge of, with reference to the logical volume management table 205a stored in the storage unit 204a. Likewise, the processor 203b of the virtualization switch device 2b determines whether the request is a request the processor is in charge of, with reference to the logical volume management table 205b stored in the storage unit 204b. For example, the logical volume management tables 205a and 205b of FIG. 2 illustrate that LV-01 and the virtualization switch device 2a correspond to each other. Accordingly, if the request is a request sent to LV-01, the processor 203a of the virtualization switch device 2a determines that the processor is in charge of the request. Note that since the virtualization switch device 2a communicates with the disk device 3 via the CM 30a, the request may be transferred from the CM 30a to the CM 30b depending on its destination address in the logical volume LV-01.

In the meantime, the server 1 only specifies the logical volume LV-01 or logical volume LV-02 as the destination of a request and does not control actual access to the disk units 305-1 to 305-8. Accordingly, it does not know which of the CMs 30a and 30b is being accessed.

Cases where the terminal 4 makes a request to a logical volume in this state will be described.

First, a case where a request received by the CM 30a or CM 30b is to write data to a disk unit under its charge will be described.

Figure 7:
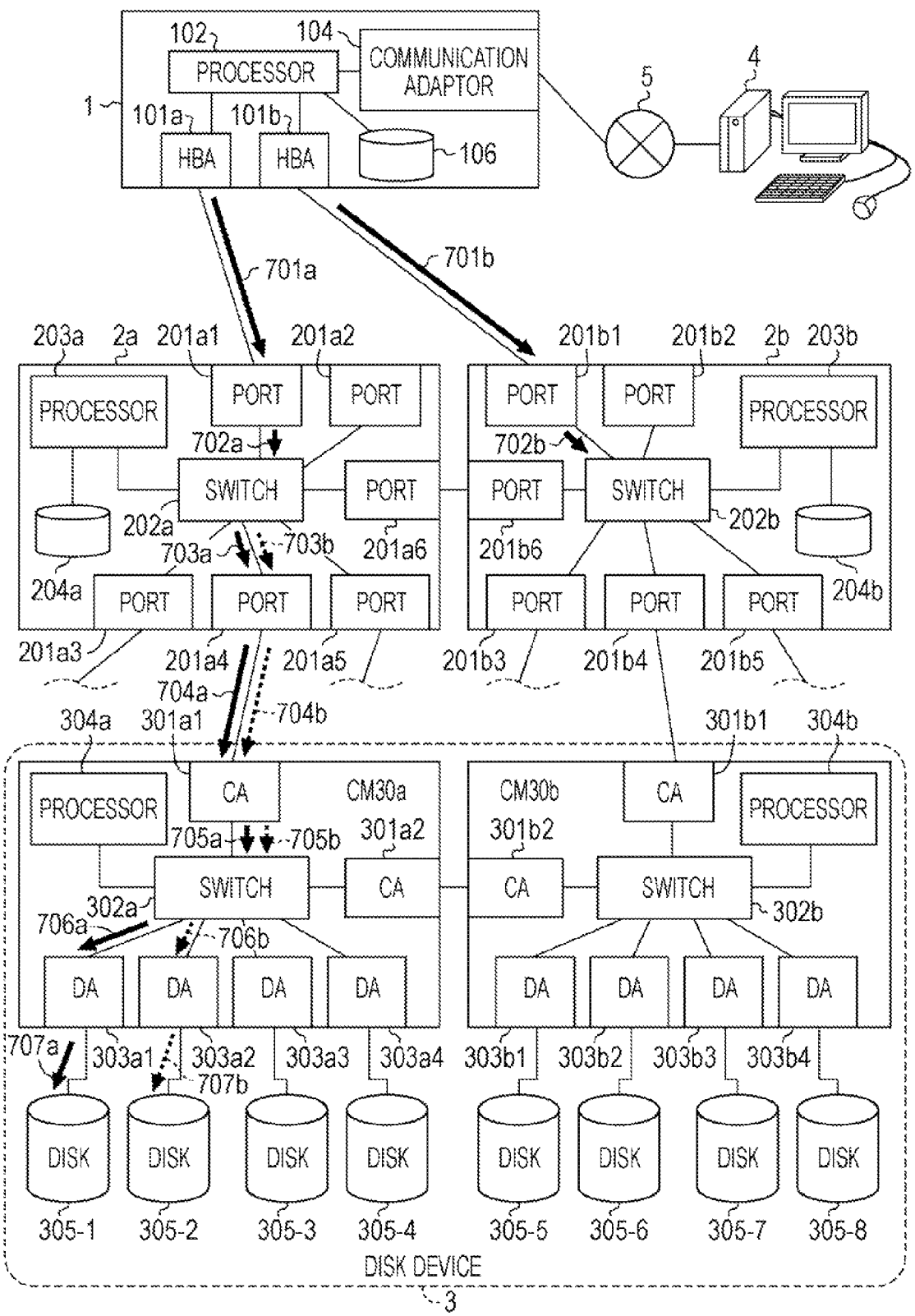
FIG. 7 is a diagram illustrating example processes performed by the storage system according to this embodiment.

This case will be described specifically with reference to FIG. 7, assuming that the terminal 4 has sent a write request to "000100h" of "LV-01" to the server 1.

The processor 102 of the server 1 receives this request via the communication adaptor 104 and sends the write request to both the virtualization switch devices 2a and 2b via the HBAs 101a and 101b (arrows 701a and 701b).

The ports 201a1 and 201b1 of the virtualization switch devices 2a and 2b receive the write requests and transfer them to the switches 202a and 202b (arrows 702a and 702b). When the processors 203a and 203b receive the requests via the switches 202a and 202b, they determine which of the virtualization switch devices 2a and 2b is in charge of this request, with reference to the logical volume management tables 205a and 205b. In this embodiment, the virtualization switch device 2a is in charge of the request, so the processor 203b does not perform the subsequent processes.

The processor 203a, which is in charge of the request, converts the destination address in accordance with the above-mentioned procedure with reference to the address conversion table 210a.

In this embodiment, the address conversion table 210a illustrated in FIG. 3 is stored. Accordingly, the processor 203a generates a write request by converting the destination of the write request into "000100h" of the disk unit 305-1 with reference to this table. The processor 203a then controls the switch 202a to send the generated write request to the disk device 3 (arrows 703a and 704a).

Here, the processor 203a also refers to the RAID management table 211 to generate a similar write request to be sent to an address 000100h of the disk unit 305-2 serving as a mirror. The processor 203a then controls the switch 202a to send this write request to the disk device 3 (arrows 703b and 704b).

The CA 301a1 of the CM30a of the disk device 3 receives these requests and transfers them to the switch 302a (arrows 705a and 705b). In accordance with these requests, the processor 304a controls the switch 302a to send the write requests to the destination disk units (arrow 706a→707a, arrow 706b→707b).

As seen, when the CM 30a or CM 30b receives a request to be sent to the disk units 305-1 to 305-4 or disk units 305-5 to 305-8 under its command, no load is imposed on the virtualization switch device or CM that has not received the request (in the above case, the virtualization switch device 2b and CM 30b).

Next, a case where a request received by the CM 30a or CM 30b is to write data to a disk unit not under its command will be described.

This case will be described specifically with reference to FIG. 8, assuming that the terminal 4 has sent a write request to "000100h" of "LV-02" to the server 1.

In this case, the server 1 sends the write request to the virtualization switch devices 2a and 2b (arrows 801a and 801b), and the processor 203b of the virtualization switch device 2b generates a write request by converting the destination of the write request into "040100h" of "305-3" and sends the generated write request to the CM 30b (arrows 803a and 804a). The destination of a mirror write request is "040100h" of "305-4." This write request is also sent to the CM 30b (arrows 803b and 804b).

When the CA 301b1 receives these write requests, the processor 304b refers to the destinations of the write requests. The processor 304b then recognizes that the destinations are not any of the disk units 305-5 to 305-8 under its command and controls the switch 302b to sends the write requests to the CM 30a via the CA 301b2 (arrows 805a and 805b, arrows 806a and 806b).

The CA 301a1 of the CM 30a receives these write requests and transfers them to the switch 302a (arrows 807a and 807b). The processor 304a then controls the switch 302a to transfer the write requests to the destination disk units (arrows 808a and 809a, arrows 808b and 809b).

As illustrated in this example, when the CM 30a or CM 30b receives requests to be sent to the disk units 305-5 to 305-8 or disk units 305-1 to 305-4 not under its command, a load is imposed on both the CMs 30a and 30b.

Next, a copy process performed between disk units under the command of the same CM will be described.

Such a copy process will be described with reference to FIG. 9 using a case where the terminal 4 has sent to the server 1 a request for copying data in "000000h" of "LV-01" to "040000h" of LV-01. Note that the server 1 has received the copy request and sent it to the virtualization switch devices 2a and 2b by controlling the HBAs 101a and 101b (arrows 901a and 901b).

A copy process includes a process of reading data in the copy source and a process of writing the read data to the copy destination. In this embodiment, a virtualization switch device corresponding to the copy source logical volume is in charge of the read and write processes.

The processors 203a and 203b of the virtualization switch devices 2a and 2b receive the copy request via the ports 201a1 and 201b1 and the switches 202a and 202b thereof (arrows 902a and 902b) and determine which of the virtualization switch devices 2a and 2b is in charge of the request, with reference to the virtualization switch device-in-charge management tables 206a and 206b. This determination will be described later. Here, assume that they have determined that the virtualization switch device 2a is in charge. In this case, the processor 203b, which is not in charge, does not perform the subsequent processes. On the other hand, the processor 203a converts the address of the copy source logical volume contained in the copy command into an address of a corresponding disk unit with reference to the address conversion table 210a. In this embodiment, the logical volume address is converted into "000000h" of the "disk unit 305-1."

The processor 203a then generates a read request corresponding to the converted address and controls the switch 202a to send the read command to the CM 30a (903, 904).

The processor 304a receives this read command via the CA 301a1 and the switch 302a and controls the switch 302a to send the read command to the corresponding disk unit 305-1.

The disk unit 305-1 reads the data, and the read data is transferred to the switch 202a of the virtualization switch device 2a in accordance with a procedure reverse to the arrows 903 to 906 (907 to 912). The processor 203a previously converts the address of the copy destination contained in the copy request from the server 1 using the address conversion table 210a and generates a request for writing the data received by the switch 202a to the converted address. The processor 203a then controls the switch 202a to send the generated write request to the CM 30a. This process is similar to the process illustrated by the arrows 704a and 704b to the arrows 707a and 707b of FIG. 7 and will not be described (913a and 913b to 917a and 917b).

As seen, it is understood that a high load is imposed on the communication path from the switch 202a of the virtualization switch device 2a in charge of copy to the switch 302a within the CM 30a having the disk units to be copied under its command, as well as on the devices involved.

Figure 8:
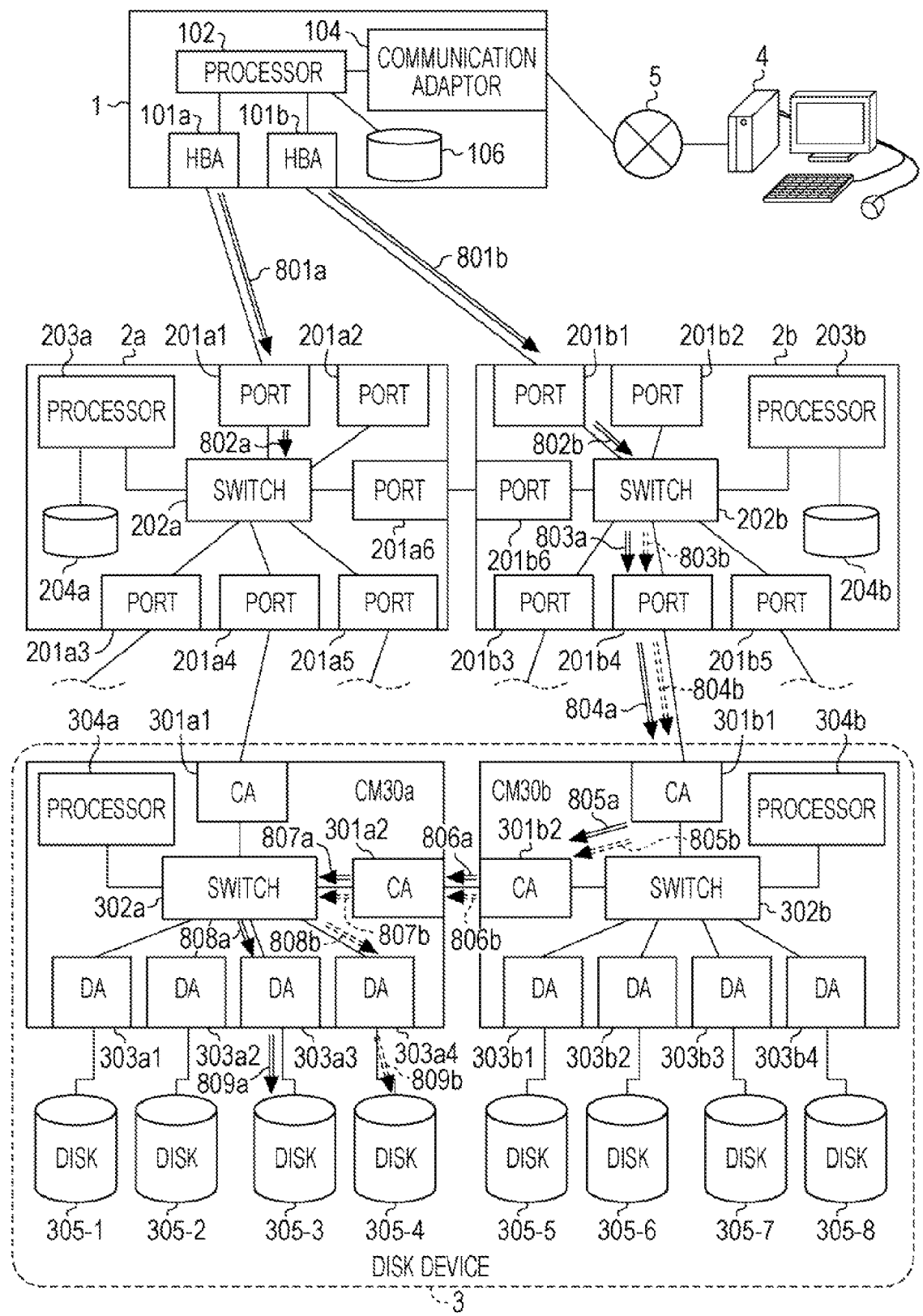
FIG. 8 is a diagram illustrating example processes performed by the storage system according to this embodiment.

As described in FIG. 8, when the virtualization switch device 2a or virtualization switch device 2b makes a request to the CM 30b or CM 30a not under its command, it sends the request to the CM 30b or CM 30a via the CM 30a or CM 30b under its command.

The same goes for copy. That is, as described in FIG. 10, when the virtualization switch device 2a or virtualization switch device 2b makes a request to the CM 30b or CM 30a not under its command, it communicates with the CM 30b or CM 30a via the CM 30a or CM 30b under its command.

This increases the communication load between the CMs 30a and 30b.

Figure 9:
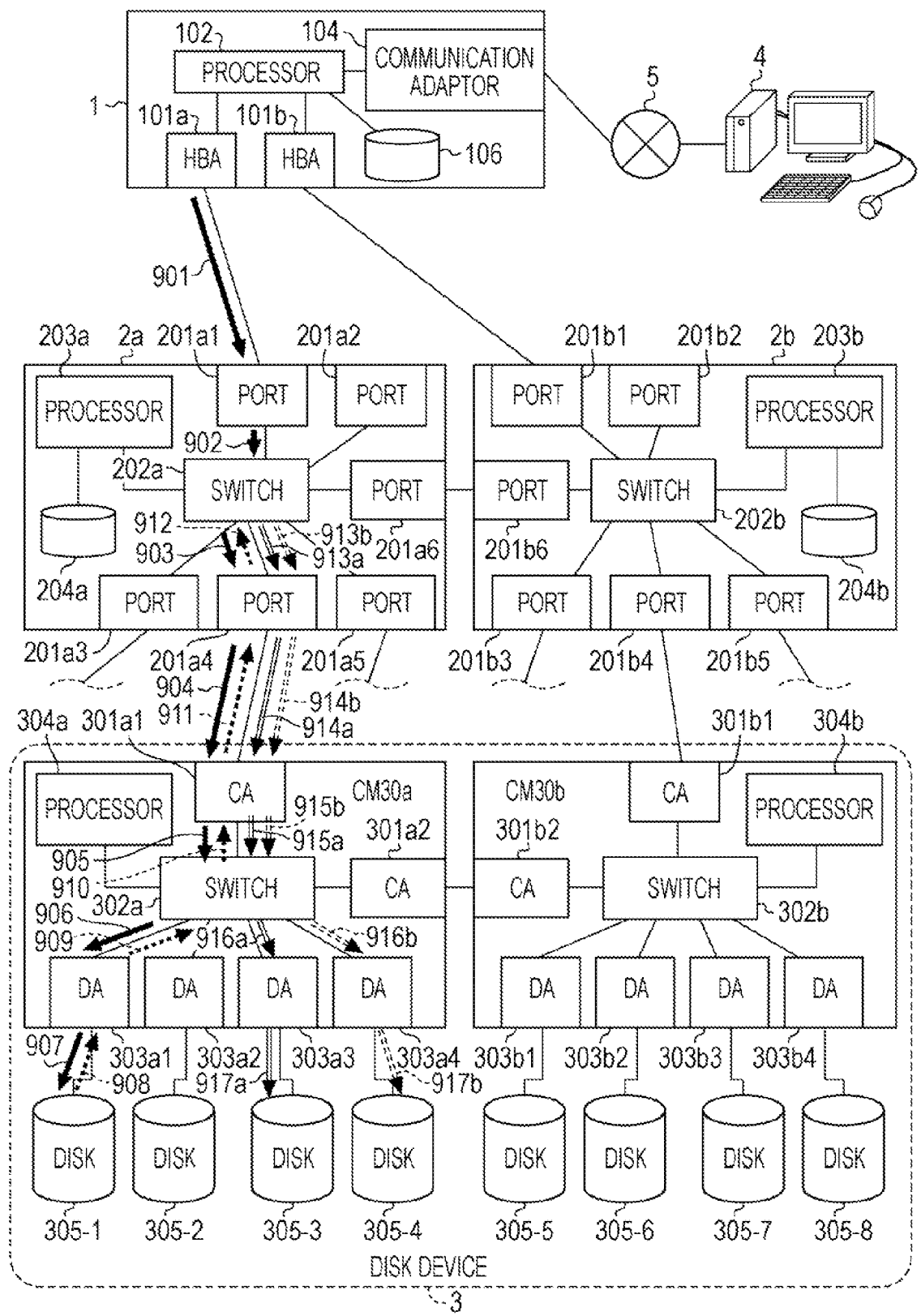
FIG. 9 is a diagram illustrating example processes performed by the storage system according to this embodiment.
Figure 10:
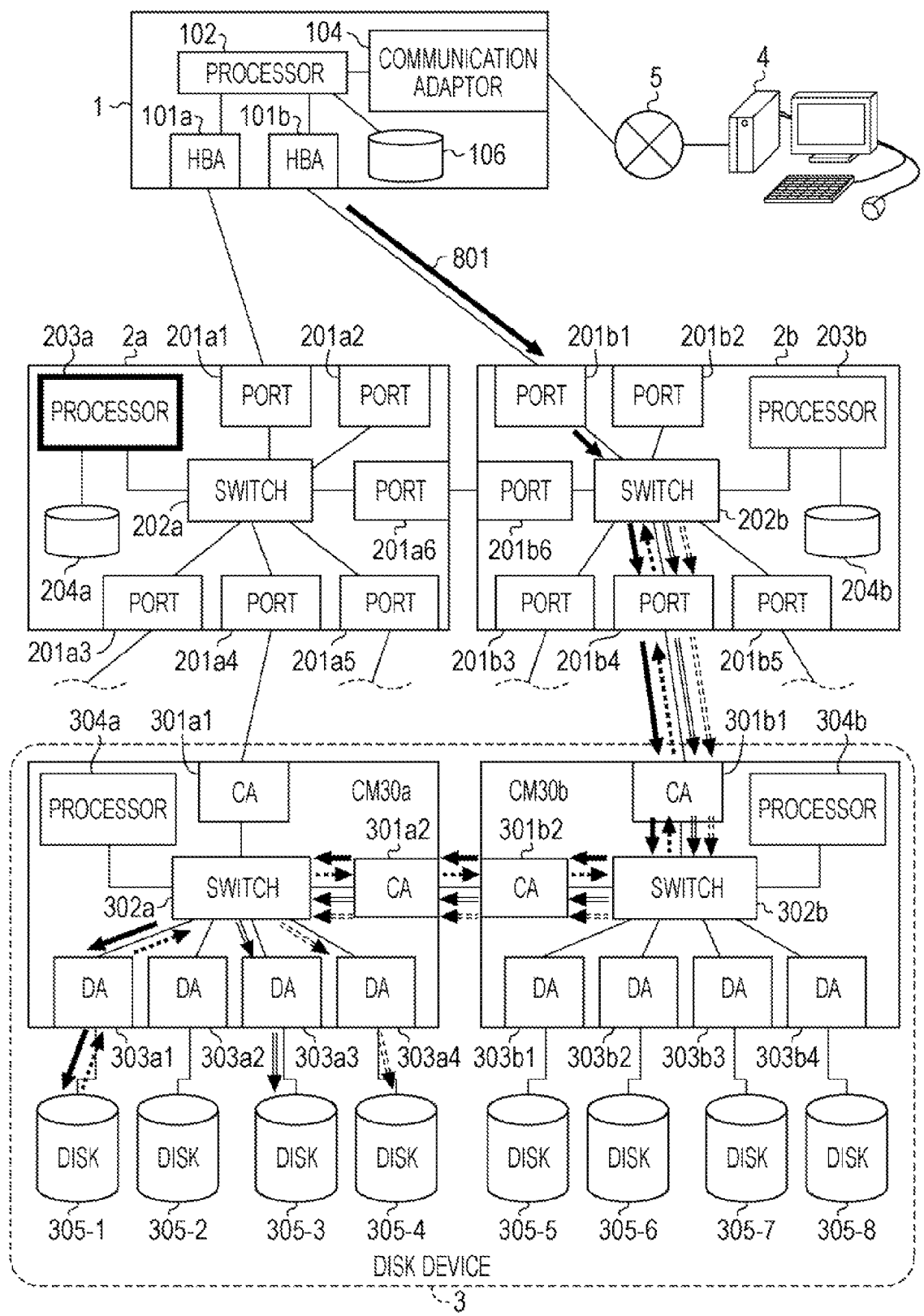
FIG. 10 is a diagram illustrating example processes performed by the storage system according to this embodiment.
Figure 11:
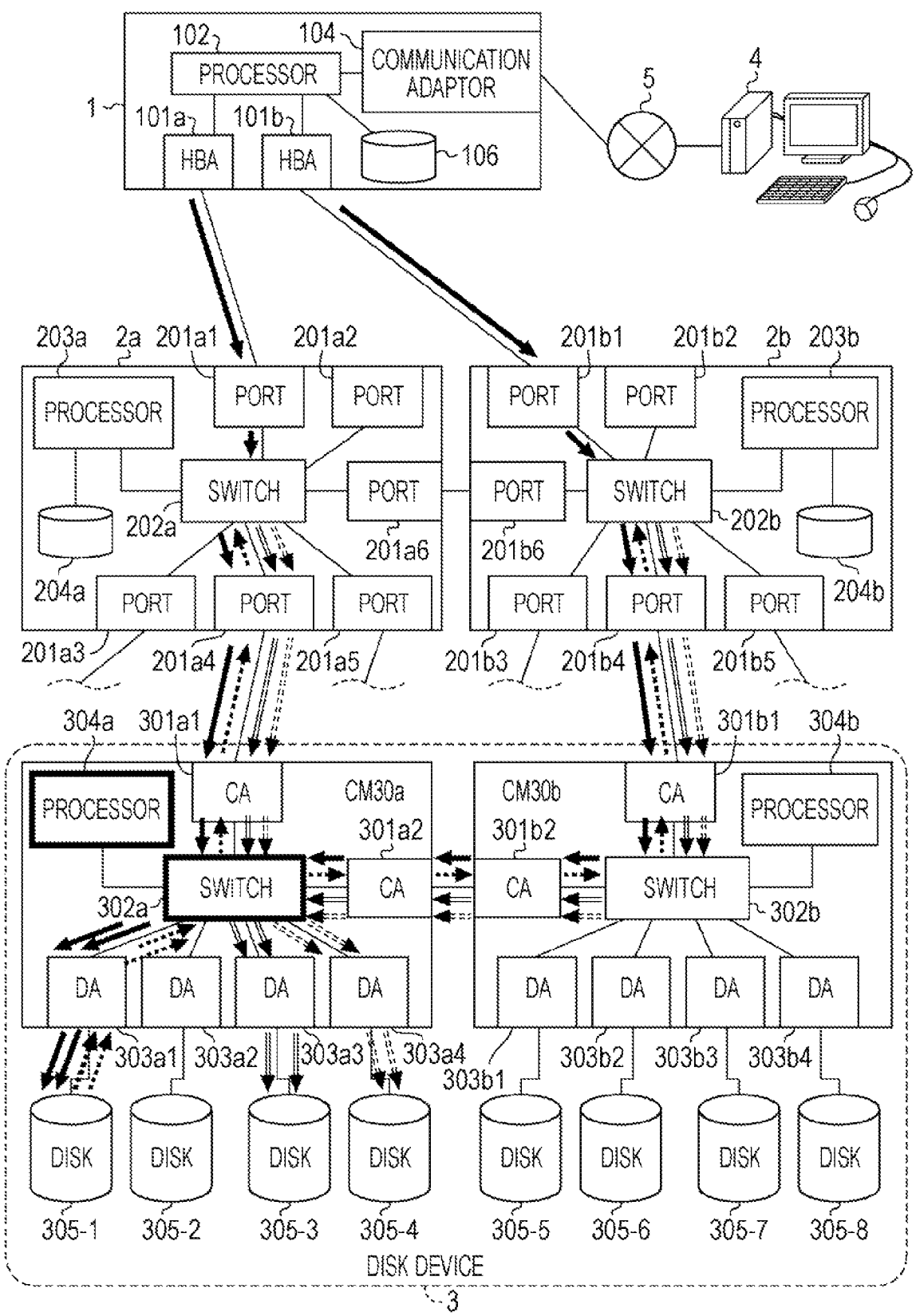
FIG. 11 is a diagram illustrating example processes performed by the storage system according to this embodiment.

FIG. 11 illustrates a case where a copy process that a virtualization switch device performs on a CM under its command, illustrated in FIG. 9, and a copy process that another virtualization switch device performs on a CM not under its command, illustrated in FIG. 10, are performed simultaneously. As illustrated in FIG. 11, a higher load is imposed on the switch 302a of the particular CM (in FIG. 11, CM 30a).

Figure 12:
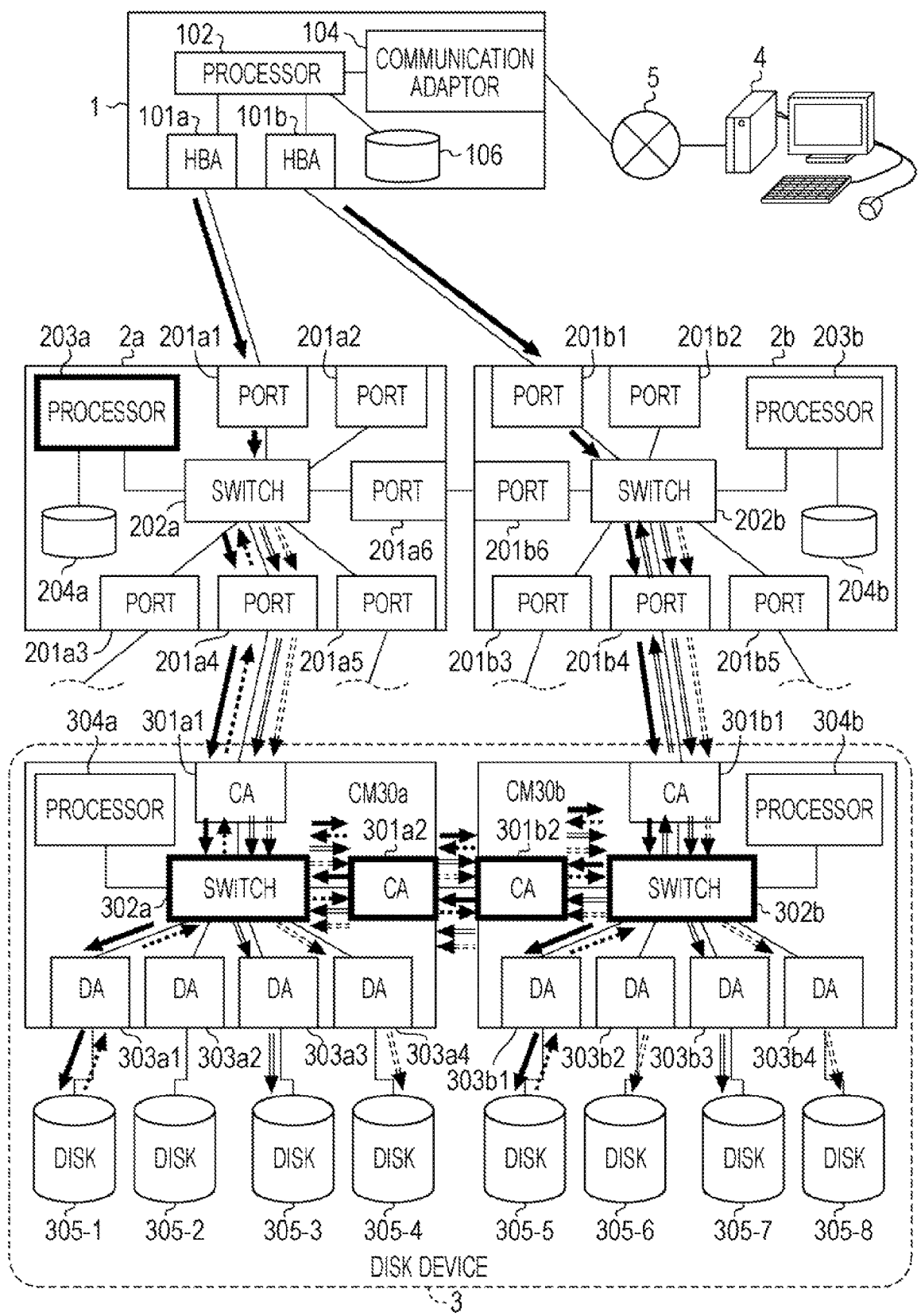
FIG. 12 is a diagram illustrating example processes performed by the storage system according to this embodiment.

FIG. 12 illustrates a case where the virtualization switch devices 2a and 2b simultaneously perform copy processes on the CMs 30b and 30a not under their command.

In such a case, communications frequently occur between the CMs 30a and 30b. Thus, a higher load is imposed on the switch 302a and CA 301a2 of the CM 30a and the switch 302b and CA 301b2 of the CM 30b.

As seen, when a copy process is performed, a higher load is imposed on particular locations in the system owing to another process. Further, a higher load is imposed on different locations depending on the situation of another process.

Where virtualization using logical volumes is not performed, the server 1 may previously store patterns having a higher load in each situation and assign a request to the virtualization switch device 2a or virtualization switch device 2b in accordance with the current processing situation.

On the other hand, where the disk units 305-1 to 305-5 are virtualized as in this embodiment, the virtualization switch devices 2a and 2b convert addresses of the logical volumes LV-01 and LV-02 into those of the physical disk units 305-1 to 305-8. For this reason, the server 1 may not know which of the disk units 305-1 to 305-8 is actually accessed in accordance with a request based on the specification of an address of the logical volume LV-01 or logical volume LV-02 and whether a communication is performed between the CMs 30a and 30b on the basis of the request.

For this reason, in this embodiment, when the server 1 receives a copy request, it conducts a copy test before performing an actual process to determine to which of the virtualization switch devices 2a and 2b the copy request may be sent. Hereafter, a process including such a copy test will be described with reference to FIG. 13.

When the processor 102 of the server 1 receives a copy request from the terminal 4 via the communication adaptor 104 (S1101 to S1102), it sends this copy request to the virtualization switch devices 2a and 2b. The processors 203a and 203b of the virtualization switch devices 2a and 2b receive this request and then refer to the logical volume management tables 205a and 205b. The processors 203a and 203b then determine that the virtualization switch device 2a or virtualization switch device 2b corresponding to the copy source logical volume in the logical volume management tables 205a and 205b is a master virtualization switch device. In this embodiment, it is assumed that the number of the copy source logical volume is 2a and that the virtualization switch device 2a has been determined to be the master.

Subsequently, the virtualization switch device 2a, which has been determined to be the master, performs the process of S1104 (S1104). This process of S1104 will be described with reference to FIG. 14.

In this embodiment, the virtualization switch device-in-charge management tables 206a and 206b stored in the storage units 204a and 204b are tables for managing copy processes in progress and are illustrated in FIG. 15. Specifically, the virtualization switch device-in-charge management tables 206a and 206b assign a session ID to each copy process and are storing the virtualization switch device 2a or virtualization switch device 2b in charge of copy for each copy process. The virtualization switch device-in-charge management tables 206a and 206b are also storing the copy source virtual volume name and the copy destination virtual volume name for each copy process, as well as the average copy rate of each copy process in progress as copy performance (Mbps). The both path status of the virtualization switch device-in-charge management tables 206a and 206b shows whether a failure is present in one or both of the access paths to the disk device 3 via the virtualization switch devices 2a and 2b and shows that if the both path status is Online, communication is possible in both paths.

For example, a virtualization switch device-in-charge management table 105 of FIG. 15 illustrates, with regard to a copy process illustrated by a session ID "1," that the virtualization switch device in charge of copy is 2a and that the copy source virtual volume and the copy destination virtual volume are "LV01" and "LV-02," respectively. The table also shows that the copy performance of the copy process illustrated by the session ID "1" is 500 Mbps. Note that when one of the virtualization switch device-in-charge management tables 206a and 206b is updated, the processors 203a and 203b communicate with each other via the ports 201a6 and 201b6 so that the other table has the same contents as the updated table. Hereafter, if not mentioned, it is assumed that when one of the virtualization switch device-in-charge management tables 206a and 206b is updated, an update process is always performed so that the other table has the same contents as the updated table.

Figure 13:
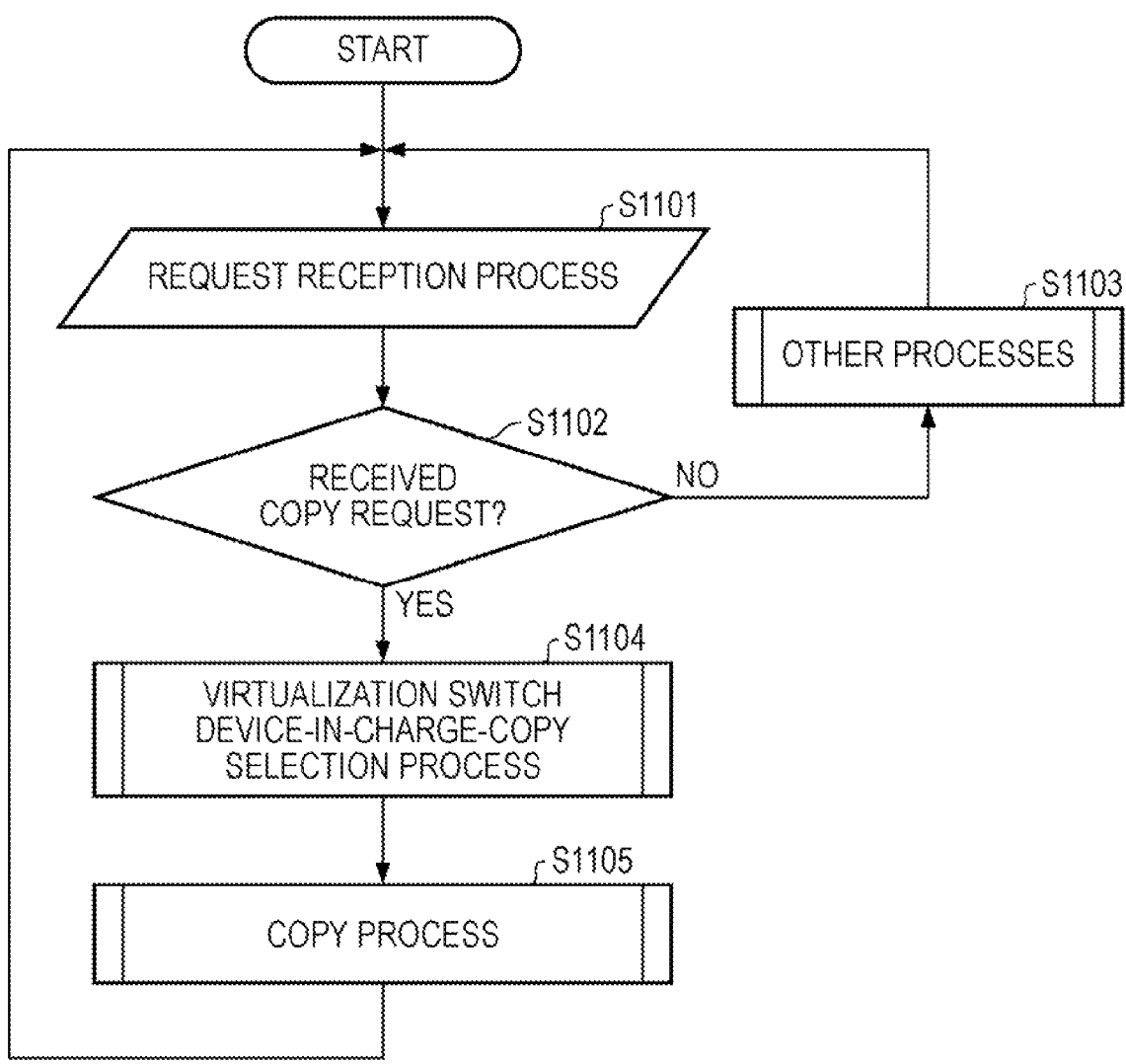
FIG. 13 is a flowchart illustrating processes when receiving a copy request according to this embodiment.
Figure 14:
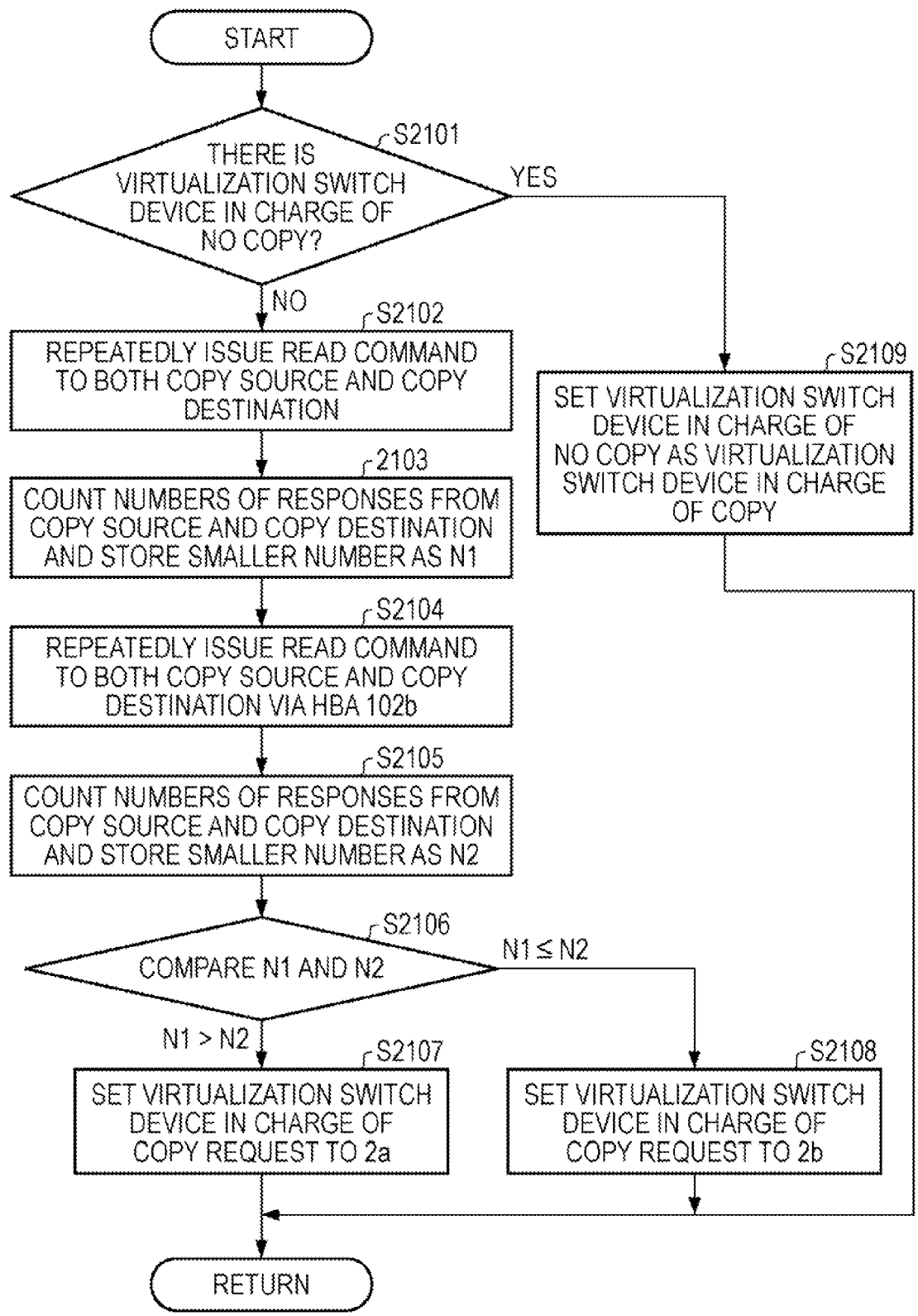
FIG. 14 is a flowchart illustrating a process of selecting a virtualization switch device in charge of copy according to this embodiment.

In the flowchart of FIG. 14, the processor 203a serving as the master refers to the virtualization switch device-in-charge-of-copy management table 206a to check whether one of the virtualization switch devices 2a and 2b is in charge of no copy (has no copy processes in the table it is in charge of) (S2101). If one of the virtualization switch devices 2a and 2b is in charge of no copy, the processor 203a instructs this virtualization switch device to take charge of copy as a virtualization switch device in charge of the current copy request (S2109). The processor 203a then adds the selected virtualization switch device 2b to the virtualization switch device-in-charge-of-copy management table 206a and then returns from the process illustrated in FIG. 14 to the process illustrated in FIG. 13.

Subsequently, the virtualization switch device 2b, which has been instructed to take charge of copy, performs an actual copy process (S1105).

This process allows transfer of the copy request to the low-load virtualization switch device (2a or 2b) without performing the copy test process illustrated in S2102 to S2108.

In contrast, as illustrated in FIG. 14, if both the virtualization switch devices 2a and 2b are performing any copy process when the processor 203a refers to the virtualization switch device-in-charge-of-copy management table 105, the processor 203a performs the processes of S2102 to S2108.

That is, first, the processor 203a repeatedly issues a read command to the both the copy source address and the copy destination address contained in the copy request (S2102).

Subsequently, the virtualization switch device 2a counts the respective numbers of responses within a predetermined time to the read commands issued to both the copy source address and the copy destination address and stores the smaller number as N1 (S2103). Although the location where the number is stored is not particularly specified, it is assumed that the number is stored in the storage area within the processor 102 or in a memory (not illustrated).

Since a copy process is a process of writing data in the copy source to the copy destination, the data may not be written unless reading of the data is completed, and next data may not be written unless writing of the previous data is completed. That is, even if one of the copy source and the copy destination is faster in processing speed than the other, the copy process may not be performed only at the slower processing speed of the other. Accordingly, the smaller counted number within the predetermined time, that is, the counted number of the slower is used.

Subsequently, through the port 201a6, the processor 203a instructs the virtualization switch device 2b to repeatedly issue a read command to both the copy source address and copy destination address contained the copy request (S2104).

The processor 203b receives this instruction, counts the respective numbers of responses within a predetermined time, and sends the smaller number to the virtualization switch device 2a as N2 via the port 201b6. The processor 203a receives and stores N2 (S2105). Although the location where the number is stored is not particularly specified, it is assumed that the number is stored in the storage area within the processor 102 or in a memory (not illustrated). The reason why the smaller counted number is used is the same as that shown in the above-mentioned S2103.

The processor 203a then compares the stored N1 and N2 (S2106). If the value of N1 is larger than N2, the processor 203a determines that the virtualization switch device in charge of the copy request is 2a, and continuously takes charge of the copy process. This is because the processor 203a determines that the larger response number represents better transfer performance (S2107) In contrast, if the value of N2 is larger than N1, the processor 203a instructs the virtualization switch device 2b to perform the copy process.

After the processes of S2107 and S2108, the processor 203a stores the virtualization switch device 2a or virtualization switch device 2*b* in charge of copy in the management table 206*a* and then returns from the process illustrated in FIG. 14 to the process illustrated in FIG. 13.

Upon completion of the process of FIG. 14, the processor 203*a* or processor 203*b* of the virtualization switch device 2*a* or virtualization switch device 2*b* in charge of copy performs the copy process.

As described above, the server 1 may not know how the virtualization switch device 2*a* or virtualization switch device 2*b* is accessing the disk units 305-1 to 305-8, owing to the address conversion of the logical volume into the disk device performed by the virtualization switch device 2*a* or virtualization switch device 2*b*.

However, as in the above-mentioned process, the virtualization switch device serving as the master (2*a* in this embodiment) conducts a test about the transfer speed to grasp the speed of the actual copy process and then selects 2*a* or 2*b* as a virtualization switch device to which the copy request is to be transferred. Thus, in the storage system according to this embodiment, it is possible to send the copy request to the virtualization switch device 2*a* or virtualization switch device 2*b* which can be accessed along a path having a lower load even when the above-mentioned address conversion is performed.

The case where the terminal 4 sends a new copy request has been described above. Monitoring the transfer speed of each copy process in progress in this process allows detection of a copy process exhibiting low copy performance and re-selection of the path of such a copy process.

Figure 16:
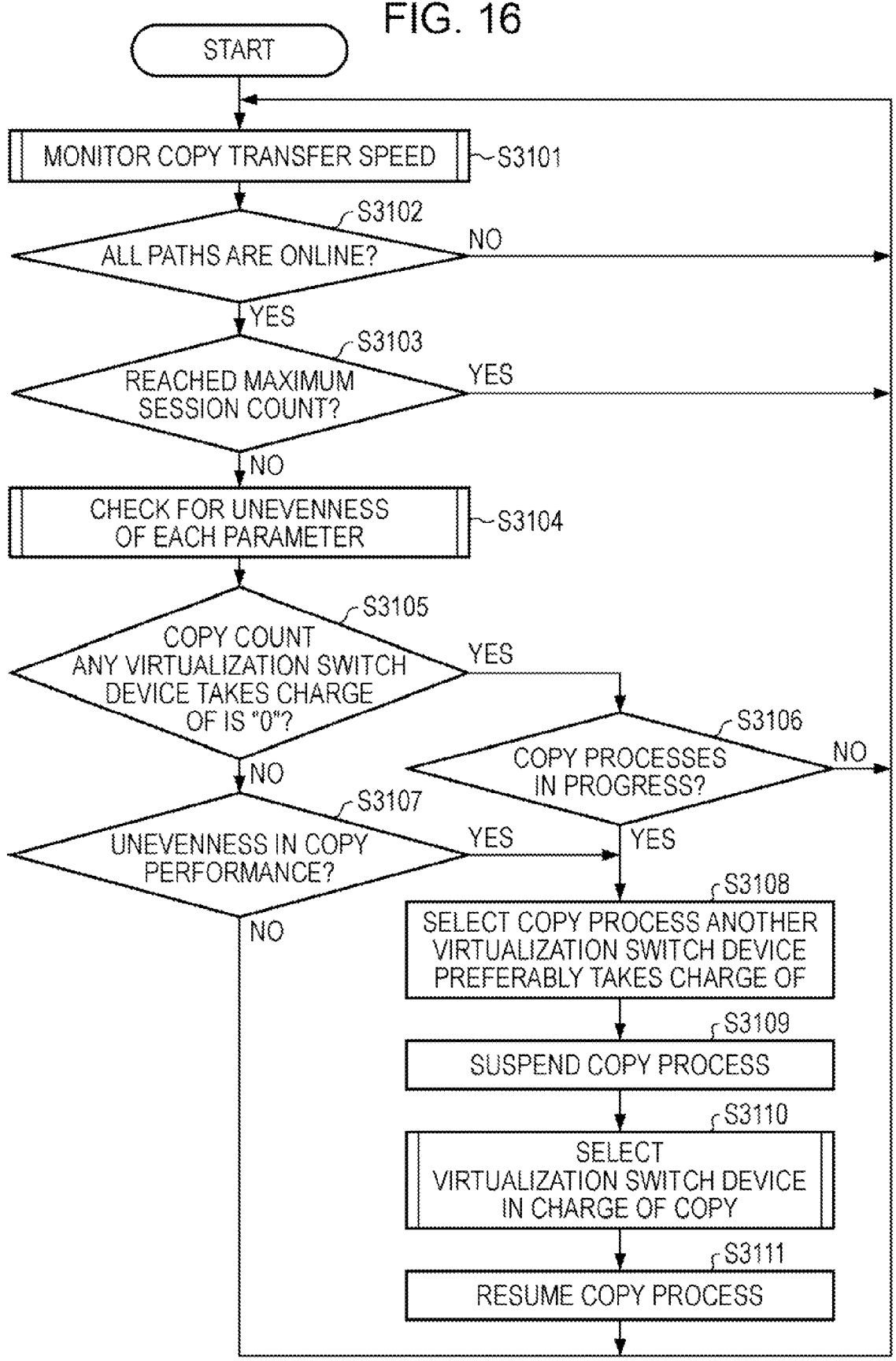
FIG. 16 is a flowchart illustrating a monitoring process according to this embodiment.

This process will be described with reference to FIG. 16.

The processor 203*a* of the virtualization switch device 2*a* serving as the master is monitoring the transfer speed of each copy process in progress with reference to the virtualization switch device-in-charge management table 206*a* (S3101).

If the processor 203*a* receives no response from one of the virtualization switch devices (2*a* or 2*b*), it updates into "Offline" the both path status of the session ID the no-response virtualization switch device (2*a* or 2*b*) is in charge of.

The processor 203*a* then checks whether all the paths are Online (S3102). If there is an Offline path, the path has a fault and thus an optimization process using a copy test may not be performed. Accordingly, the processor 203*a* returns the process to S3101.

The processor 203*a* then refers to the virtualization switch device-in-charge management table 206*a* to check whether the copy process count (session count) has reached its maximum (S3103). In this embodiment, it is assumed that the maximum session count is "15." If the session count has reached its maximum, the virtualization switch device in charge of any session may not be changed. Accordingly, optimization is not possible. For this reason, the processor 203*a* does not perform subsequent processes and returns the process to S3101.

The processor 203*a* also refers to the virtualization switch device-in-charge management table 206*a* to check for unevenness of each parameter (S3104).

In this process, the processor 203*a* checks whether there is a difference between the respective numbers of copy processes the virtualization switch devices 2*a* and 2*b* in charge of copy are performing and whether there is a copy process exhibiting lower performance than the other copy processes.

For example, when the virtualization switch device-in-charge management table 206*a* shows statuses illustrated in FIG. 17, the number of copy processes the virtualization switch device 2*a* is in charge of is 4. On the other hand, the number of copy processes the virtualization switch device 2*b* is in charge of is 2. Thus, the processor 203*a* confirms that copy processes are unevenly distributed to the virtualization switch device 2*a*.

The processor 203*b* also confirms that the transfer speed of a copy process having a session ID1 is low, as copy performance information.

The processor 203*a* then determines whether the number of copy processes one of the virtualization switch devices 2*a* and 2*b* is in charge of is "0." If there is a virtualization switch device of "0," the processor 203*a* determines whether there is a copy process in progress (S3106). If there is no copy process in progress, the virtualization switch device-in-charge management table 105 contains no item about a copy process in progress. Accordingly, the processor 203*a* determines whether there is a copy process in progress by checking whether there is an item about a copy process in progress in the virtualization switch device-in-charge management table 206*a*. If there is no copy process in progress, optimization is not done. Accordingly, the processor 203*a* proceeds to the process of S3101. If the processor 203*a* determines in the process of S3106 that there is a copy process in progress, it proceeds to the process of S3108.

Further, if the processor 203*a* determines in S3105 that none of the virtualization switch devices 2*a* and 2*b* is "0," it checks whether there is unevenness in copy performance (S3107). If there is no unevenness in performance, optimization is not done. Accordingly, the processor 203*a* returns to the process of S3101. In this embodiment, the processor 203*a* makes the determination about unevenness by determining whether there is a copy process exhibiting copy performance 30% lower than the average copy performance.

The above-mentioned unevenness determination method according to this embodiment is only illustrative and the processor 203*a* may make the determination by determining whether there is a copy process exhibiting copy performance lower than the most common copy performance by a predetermined value or more. Alternatively, the processor 203*a* may make the determination by determining whether that there is a copy process exhibiting copy performance lower than the highest copy performance by a predetermined value or more.

In contrast, if there is unevenness in performance, the processor 203*a* performs the processes of S3108 and later steps.

Since the virtualization switch device-in-charge management table 105*b* of FIG. 17 shows that the copy performance of a copy process having a session ID 1 is lower than the average copy performance (450 MBPS) by 30% or more, the processor 203*a* determines that there is a copy process exhibiting copy performance lower than the average copy performance by 30% or more.

If the processor 203*a* determines in S3106 or S3107 that it performs the processes of S3108 and later steps, it selects a copy process that another virtualization switch device, 2*a* or 2*b*, preferably takes charge of, from among the copy processes in progress (S3108).

Specifically, the processor 203*a* makes the selection on the basis of a criterion that the numbers of copy processes the virtualization switch devices 2*a* and 2*b* are in charge of are approximately equal and a criterion that the change of the virtualization switch device in charge of copy, 2*a* or 2*b*, is selectively performed with respect to a copy process exhibiting low copy performance.

That is, in the virtualization switch device-in-charge management table 206*a* of FIG. 17, the processor 203*a* selects the copy process having the session ID 1 as a copy process that another virtualization switch device preferably take charge of.

The processor 203a then suspends the copy process selected in S3108 (S3109). The processor 203a then selects a virtualization switch device in charge of copy for the copy process (S3110). This process is the process illustrated in FIG. 14. That is, if an increase in copy performance can be expected by changing the virtualization switch device in charge of the copy process in this process, a process of changing the virtualization switch device in charge of copy (2a or 2b) is performed.

When this process is complete, the virtualization switch device in charge of copy selected in S3110 resumes the copy process suspended in S3109 (S3111). The processor 203a proceeds to the process of S3101.

In selecting the virtualization switch device in charge of copy, 2a or 2b, in S3108, multiple copy processes may exhibit copy performance falling below a predetermined value, as shown in a virtualization switch device-in-charge management table 105c of FIG. 18. In this case, the processor 203a may realize optimization by collectively handling the multiple copy processes and performing the process of S3110 on each copy process.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A virtualization control apparatus of a storage system, the storage system including a plurality of storage controllers controlling a plurality of storage units connected thereto and a plurality of virtualization switch units being connected to one of the storage controllers, each of the virtualization switch units converting a copy source logical volume address and a copy destination logical volume address contained in a received copy request into addresses of the storage units and making a request to the storage controllers on the basis of the converted addresses, the virtualization control apparatus comprising:
   a selection unit that, when receiving a copy request, conducting a copy test corresponding to the copy request on each of the virtualization switch units before the copy request is executed, the copy test being a test that repeatedly sends requests for reading a copy source address and a copy destination address contained in the received copy request to the virtualization switch units and compares a smaller one of a number of responses within a predetermined time to a copy source read request and a number of responses within a predetermined time to a copy destination read request sent repeatedly by each virtualization switch unit with each other among the virtualization switch units, and selects one of the virtualization switch units of the highest performance among the plurality of the virtual switch units; and
   a sending unit that sends the copy request to the selected virtualization switch unit.

2. The virtualization controller according to claim 1, wherein, when any of the virtualization switch units is performing no copy process when the selection unit receives the copy request, the selection unit selects the virtualization switch unit performing no copy process, without conducting the copy test.

3. A virtualization control apparatus of a storage system, the storage system including a plurality of storage controllers that controls a plurality of storage units connected thereto and a plurality of virtualization switch units being connected to one of the storage controllers, each of the virtualization switch units converting a copy source logical volume address and a copy destination logical volume address contained in a received copy request into addresses of the storage units and making a request to the storage controllers on the basis of the converted addresses, the virtualization control apparatus comprising:
   a monitoring unit that monitors unevenness in copy performance of copy processes which process by each of the virtualization switches;
   a selection unit when detecting unevenness in the copy performance, suspending a copy process exhibiting copy performance lower than predetermined copy performance among the copy processes the virtualization switch units are performing, conducting a copy test corresponding to the suspended copy process on each of the virtualization switch units, the copy test being a test that repeatedly sends requests for reading a copy source address and a copy destination address contained in a received copy request to the virtualization switch units and compares a smaller one of a number of responses within a predetermined time to a copy source read request and a number of responses within a predetermined time to a copy destination read request sent repeatedly by each virtualization switch unit with each other among the virtualization switch units, and selecting one of the virtualization switch units of the highest performance among the plurality of the virtual switch units; and
   a processing unit that resumes the suspended copy process using the selected virtualization switch unit.

4. The virtualization controller according to claim 3, wherein, if any of the virtualization switch units is performing no copy process when the selection unit suspends the copy request, the selection unit selects the virtualization switch unit performing no copy process, without conducting the copy test.

5. A non-transitory computer-readable medium storing a program applied for a virtualization control apparatus of a storage system, the storage system including a plurality of storage controllers controlling a plurality of storage units connected thereto and a plurality of virtualization switch units being connected to one of the storage controllers, each of the virtualization switch units converting a copy source logical volume address and a copy destination logical volume address contained in a received copy request into addresses of the storage units and making a request to the storage controllers on the basis of the converted addresses, the program causing the virtualization control apparatus to execute:
   conducting, when receiving a copy request, a copy test corresponding to the copy request on each of the virtualization switch units before the copy request is executed, the copy test being a test that repeatedly sends requests for reading a copy source address and a copy destination address contained in the received copy request to the virtualization switch units, compares a smaller one of a number of responses within a predetermined time to a copy source read request and a number of responses within a predetermined time to a copy destination read request sent repeatedly by each virtualization switch unit with each other among the virtualization switch units, and selecting one of the virtualization switch units of the highest performance among the plurality of the virtual switch units; and sending the copy request to the selected virtualization switch unit.

\* \* \* \* \*